United States Patent [19]
Mosure et al.

[11] Patent Number: 5,090,868
[45] Date of Patent: Feb. 25, 1992

[54] CENTRIFUGAL PUMP

[75] Inventors: Duane C. Mosure, Poplar Grove; Norman E. Houtz, Rockford, both of Ill.

[73] Assignee: Sundstrand Corporation, Rockford, Ill.

[21] Appl. No.: 552,722

[22] Filed: Jul. 16, 1990

[51] Int. Cl.$^5$ .................... F01D 1/00; F01D 9/00
[52] U.S. Cl. ................... 415/207; 415/214.1; 415/224.5; 403/337; 417/423.012; 417/423.014
[58] Field of Search .............. 415/214.1, 213.1, 207, 415/206, 204, 212.1, 224, 224.5, 208.1, 208.2, 208.3, 209.2, 211.2; 403/337, 335; 411/432, 366, 367; 417/423.12, 423.14; 123/589.1, 561

[56] References Cited

U.S. PATENT DOCUMENTS

| | | | |
|---|---|---|---|
| 1,819,485 | 8/1931 | Sedlmeier | 415/208.1 |
| 2,084,863 | 6/1937 | Moss | 415/209.2 |
| 2,753,702 | 7/1956 | Dunn | 403/337 |
| 4,022,541 | 5/1977 | Perrieo et al. | 415/208.3 |
| 4,181,466 | 1/1980 | Owen | 415/207 |
| 4,302,150 | 11/1981 | Wieland | 415/208.3 |

FOREIGN PATENT DOCUMENTS 505102 8/1954 Canada .................. 403/337

Primary Examiner—Edward K. Look
Assistant Examiner—Hoang Nguyen
Attorney, Agent, or Firm—Harold A. Williamson

[57] ABSTRACT

This invention relates to a centrifugal pump, bearing housing, diffuser ring, and volute housing fastening arrangement in which a plurality of containment pump bolts pass through, in one direction, corresponding openings in the bearing housing, the diffuser ring, and the volute housing, whereas gear box mounting bolts pass through in an opposite direction corresponding openings in the bearing housing, the diffuser ring, and the volute housing. The mounting bolts are secured in a portion of a gear box. The mounting bolts therefore provide a function of providing pressure containment for the pump in the event that a containment pump bolt or fastener is missing or ineffective, in which case a load carried by a missing pump bolt is carried by a nearby mounting bolt. The containment pump bolts, having bolt heads adjacent the gear box, to prevent inadvertent torquing during routine maintenance.

7 Claims, 2 Drawing Sheets

CENTRIFUGAL PUMP

TECHNICAL FIELD

This invention relates to a centrifugal pump and a fastening arrangement to secure a bearing housing, diffuser ring, and volute housing as an integral unit while additionally securing the pump to a gear box.

BACKGROUND ART

In an aerospace environment in which the instant invention finds utility, centrifugal fuel pumps in the past have been secured to a gear box within an aircraft by means of arcuate V-band sections or a single V-band which overlaps abutting lips on a pump and gear box. In other words, the V-band is simultaneously rapped around both a lipped portion on the pump and an abutting lip on the gear box such that a single bolt or bolts cooperating with the V-band may be employed to secure the pump to the gear box.

Centrifugal fuel pumps which include among other components a bearing housing, diffuser ring, and volute housing are held together against internal pressure by a circular pattern of pump bolts. The number of bolts employed is usually equal to the number of diffusers in the diffuser ring.

In the field of aerospace there is a continuous effort to reduce weight and provide damage-tolerant pressure containment of the pump structure and its mounting to a gear box, all of which have been accomplished with fewer pump bolts by the instant invention.

DISCLOSURE OF THE INVENTION

More specifically, this invention relates to a centrifugal pump, bearing housing, diffuser ring, and volute housing fastening arrangement in which a plurality of containment pump bolts pass through, in one direction, correspond openings in the bearing housing, the diffuser ring, and the volute housing, whereas gear box mounting bolts pass through in an opposite direction corresponding openings in the bearing housing, the diffuser ring, and the volute housing. The mounting bolts are secured in a portion of a gear box. The mounting bolts therefore provide a function of providing pressure containment for the pump in the event that a containment pump bolt or fastener is missing or ineffective, in which case a load carried by a missing pump bolt is carried by a nearby mounting bolt. The containment pump bolts have bolt heads adjacent the gear box to prevent inadvertent torquing during routine maintenance.

It is therefore a primary object of this invention to provide a centrifugal pump with a damage-tolerant pressure containment structure without the use of oversize bolts even when a pump pressure-containment bolt or fastener may be under torqued or missing.

A further object of the invention is to provide a compact centrifugal pump structure wherein bolts employed in mounting the pump to a gear box serve an additional function of providing for pressure containment within the pump due to the mounting bolts' ability to carry pressure loads generated within the pump.

In the attainment of the foregoing objects, the invention contemplates in its preferred embodiment a fastening arrangement for a centrifugal fuel pump which includes a bearing housing, a diffuser ring, and a volute housing. The pump bearing housing is adapted for insertion in a gear box. The bearing housing has mounted for rotation therein an impeller shaft having secured thereto a pump impeller. The bearing housing further includes an annular flange that is provided with a plurality of openings radially disposed from an axis of rotation of the impeller shaft.

A diffuser ring surrounds the pump impeller and is provided with a number of openings which are positioned to correspond with a number of the openings of the annular flange.

A volute housing surrounds the diffuser ring, the pump impeller, and the annular flange. The diffuser ring is interposed between a portion of the annular flange and a portion of the volute housing. The diffuser ring matingly fits in a recessed region of the annular flange portion and recessed region of the volute housing portion. There are selected corresponding openings in the annular flange, the diffuser ring, and the volute housing which define gear box mounting fastening openings. The remaining corresponding openings in the annular flange, the diffuser ring, and the volute housing define pump fastening openings.

The gear box mounting openings are adapted to receive a bolt in one direction therethrough which is secured in a threaded opening in the gear box.

The remaining openings have therethrough pump fastening bolts in an opposite direction to secure the annular flange, the diffuser ring, and the volute housing into a unitary assembly. The pump fastening bolts have heads immediately adjacent the annular flange and proximate a gear box when the pump is installed in an aircraft. The pump mounting bolts have bolt heads immediately adjacent the volute housing and remote from the gear box. This just-described arrangement prevents the inadvertent torquing of the pump fastening bolts as these bolts are inaccessible when the pump is installed.

In high pressure fuel pumps, the diffuser rings are typically clamped between pump support structures and held in a unitary assembly by means of bolts that pass through the diffuser ring and secure the ring to the support structures. Because of the extremely high fluid pressures in and about the diffuser ring assembly, pump fastening bolts as frequenty inserted through openings in the diffuser ring at points between adjacent diffuser throats.

It has been discovered that the tremendous loads experienced by the pump fastening bolts find their origin in the fact that while the diffuser ring is clamped between support structures, surfaces of the diffuser ring adjacent the support structures are wetted by the fluid being pumped. These wetted faces of the diffuser ring are exposed to a range of fluid pressures from the fluid that exits a pump impeller and the pressure at an exit end of a diffuser throat of the diffuser ring. It will be appreciated that when these just described fluid pressures are present over a diffuser ring surface, a force equal to the product of the area of the diffuser ring face times the fluid pressures over the diffuser ring surface will be present. The just described force must be accommodated by the pump fastening bolts. Details of this facet of the invention are set forth in co-pending U.S. patent application Ser. No. 07/552723.

Other objects and advantages of the present invention will be apparent upon reference to the accompanying description when taken in conjunction with the following drawings:

BEST MODE FOR CARRYING OUT THE INVENTION

Figure 1:
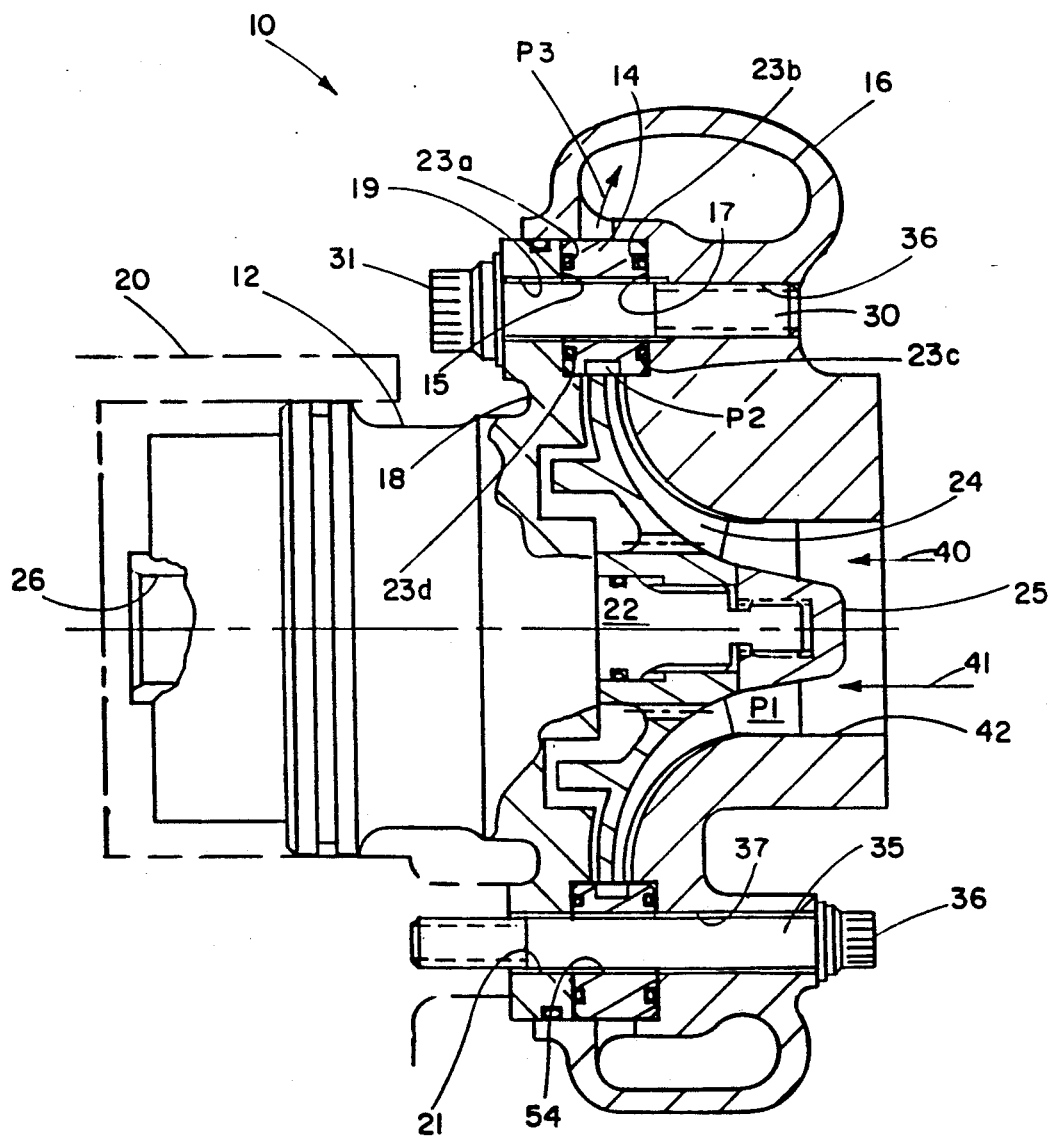
FIG. 1 is a partial cross section of a centrifugal pump which embodies the invention.

Reference is now made to FIG. 1 which illustrates in section a preferred embodiment of the invention.

A centrifugal fuel pump 10 generally indicated by an adjacent arrow includes a bearing housing 12, a diffuser ring 14, and a volute housing 16 disposed in the relationship shown in FIG. 1. The bearing housing 12 is shown mounted in a gear box 20 as indicated by the solid and broken lines depicted in FIG. 1.

The bearing housing 12 further includes an annular flange element 18.

In practice the annular flange is a continuous element which includes a plurality of flange openings therethrough, two of which flange openings 19, 21 are shown in section in FIG. 1. The total number of flange openings will be better appreciated upon study and explanation of FIG. 2 hereinafter.

The bearing housing 12 has mounted for rotation therein an impeller shaft 22 which carries secured thereto in a wholly conventional fashion a pump impeller 24 fastened in place by pump fastener 25. The impeller shaft 22 is driven by a gear box output drive shaft (not shown) which drive shaft engages a splined opening 26 in a schematically shown end portion of impeller shaft 22.

It will be observed that the pump impeller 24 terminates immediately adjacent the diffuser ring 14. The annular flange 18 and volute housing 16 are provided with annularly disposed recessed regions 15, 17 into which the diffuser ring 14 matingly fits. "O" ring pairs 23a, 23d and 23b, 23c provide a fluid seal in the recessed regions 15, 17 between the diffuser ring 14, annular flange 14, and volute housing 16.

A pump fastening bolt 30 is shown threaded into volute housing 16. It is to be noted that the bolt 30 includes a bolt head 31 which is adjacent the gear box 20 when centrifugal pump 10 is installed for use in the gear box 20.

The entire pump 10 is threadably secured to the gear box 20 by a number of gear box fastening bolts, one of which 35 is seen in FIG. 1. The gear box fastening bolt 35 has a bolt head 36 positioned on a side of the fuel pump 10 which is opposite a pump fastening head 31. The advantageous significance of this just described relationship will be set forth in greater detail hereinafter.

In operation the fuel pump 10 receives fuel shown by arrows 40, 41 at a pressure $P_1$ as indicated at pump inlet 42. The pump impeller delivers fuel at an elevated pressure $P_2$ to diffuser ring 14. Fuel exiting the diffuser ring 14 is at pressure $P_3$ which is at a yet higher pressure than $P_2$.

Figure 2:
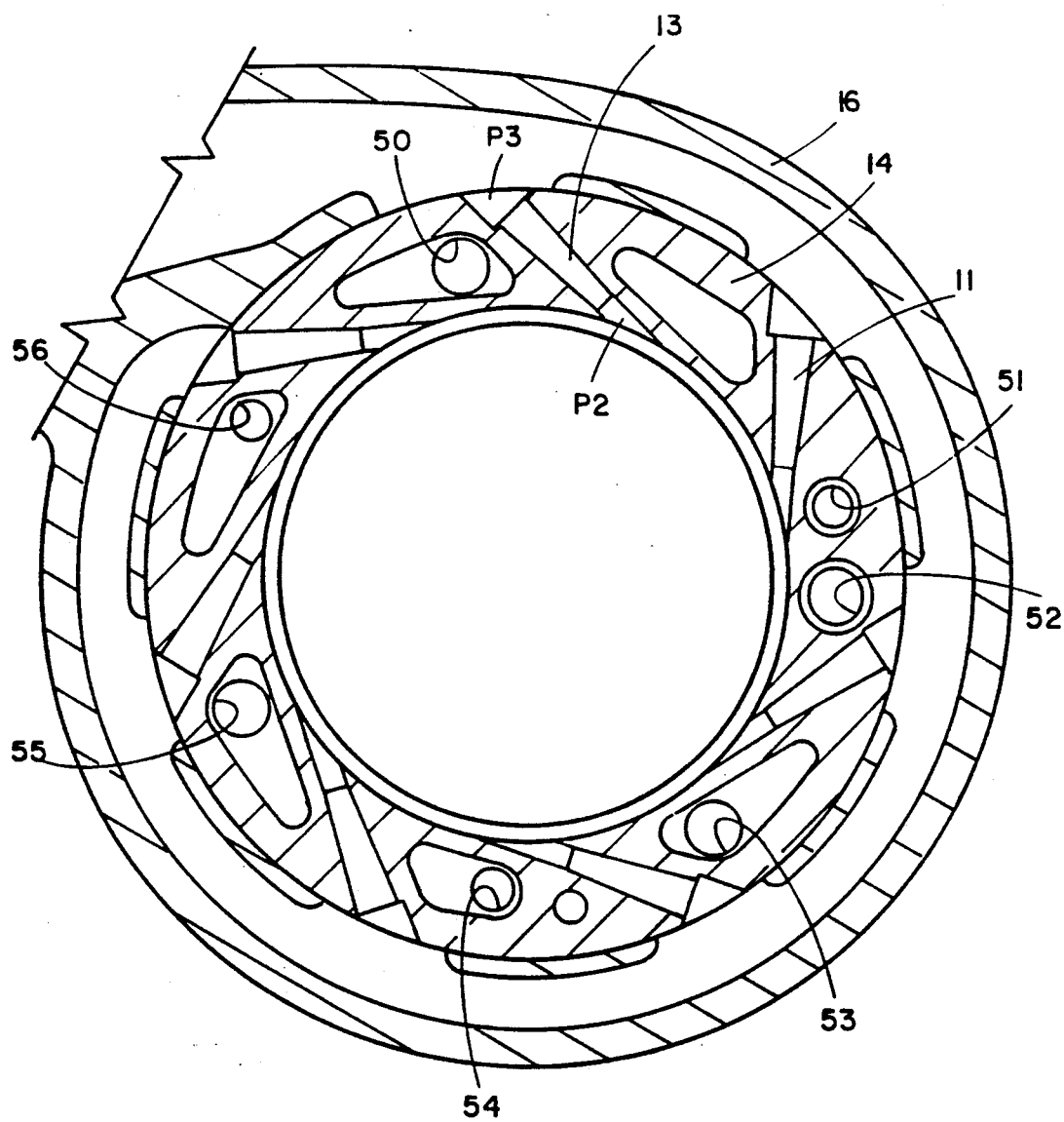
FIG. 2 is a partial section of FIG. 1 showing a cross section of an entire diffuser ring and a portion of a volute housing external to a diffuser ring.

Attention is now directed to FIGS. 1 and 2 for the description that ensues. More specifically, FIG. 2 shows in section generally along lines A-A and B-B of FIG. 1 the volute housing 16 and diffuser ring 14. The diffuser ring 14 includes a plurality of typical diffusers 11, 13, two of which are referenced. The pump impeller 24 and its related pump impeller fastener 25 are not shown in FIG. 2 to facilitate the reader's appreciation of the cooperative relationship of the volute housing 16 and diffuser ring 14.

The diffuser ring includes a plurality of openings 50, 51, 52, 53, 54, 55, and 56 which openings correspond to an equal number of openings in the annular flange 18. More specifically, diffuser ring opening 50 corresponds to annular flange opening 19, see FIG. 1, whereas diffuser ring opening 54 corresponds with annular flange opening 21, see FIG. 1.

The volute casing 16 as best seen in FIG. 1 includes volute housing openings, such as openings 36, 37, which correspond in number with diffuser ring openings 50, 51, 52, 53, 54, 55, and 56.

In the preferred embodiment of the invention diffuser ring openings 50, 52, 53, and 55 receive pump fastening bolts of the same type as pump fastening bolt 30 described earlier, whereas diffuser ring openings 51, 54, and 56 received gear box fastening bolts of the same type as gear box fastening bolt 35 described earlier.

This just described arrangement which makes simultaneous use of gear box mounting bolts to enhance and ensure that the pump described remains leak free, even should a pump fastening bolt be missing or under torqued, represents an advance of the present art.

Additionally, the location of the pump fastening bolt heads such as bolt head 31 immediately adjacent the annular flange 18 and proximate the gear box 20 ensures that when the fuel pump 10 is installed the pump fastening bolts are inaccessible to conventional tools and cannot be actuated.

Although this invention has been illustrated and described in connection with the particular embodiment illustrated, it will be apparent to those skilled in the art that various changes may be made therein without departing from the spirit of the invention as set forth in the appended claims.

We claim:

1. A centrifugal pump bearing housing, diffuser ring, and volute housing fastening arrangement comprising:
    a pump bearing housing adapted for insertion in a gear box, said bearing housing having mounted for rotation therein an impeller shaft having secured thereto a pump impeller, said bearing housing having an annular flange means which flange means includes a plurality of openings radially disposed from an axis of rotation of said impeller shaft,
    a diffuser ring surrounding said pump impeller and provided with a number of openings which are positioned to correspond with a number of said openings of said annular flange,
    a volute housing surrounding said diffuser ring, and said pump impeller, said volute housing having a number of openings which are positioned to correspond with said openings of said diffuser ring and said annular flange means,
    selected corresponding openings in said annular flange means, said diffuser ring, and said volute housing define gear box mounting fastening openings, remaining corresponding openings in said annular flange means, said diffuser ring and said volute housing defining pump fastening openings,
    said gear box mounting openings adapted to receive fastening means in one direction therethrough to be secured to said gear box, and
    said remaining openings having therethrough pump fastening means in an opposite direction to secure said annular flange means, said diffuser ring, and said volute housing into a unitary assembly.

2. The centrifugal pump arrangement of claim 1 wherein said volute housing surrounds said annular flange means.

3. The centrifugal pump arrangement of claim 1 wherein said diffuser ring matingly fits in a recessed region of said annular flange means and a recessed region of said volute housing.

4. The centrifugal pump arrangement of claim 1 wherein said pump fasteners are only actuateable at points immediately adjacent said annular flange and proximate said gear box whereas said gear box mounting openings when provided with gear box fasteners are only actuateable at a point immediately adjacent said volute housing and remote from said gear box.

5. The centrifugal pump arrangement of claim 1 wherein said plurality of openings in said flange means are all radially disposed at an equal radial distance from said axis of rotation of said pump impeller.

6. The centrifugal pump arrangement of claim 5 wherein said volute housing surrounds said annular flange.

7. The centrifugal pump arrangement of claim 6 wherein said diffuser ring matingly fits in a recessed region of said annular flange means and a recessed region of said volute housing.

* * * * *